United States Patent

[11] 3,588,774

| [72] | Inventor | Frank Caveney<br>West Carteret, N.J. |
|---|---|---|
| [21] | Appl. No. | 796,827 |
| [22] | Filed | Feb. 5, 1969 |
| [45] | Patented | June 28, 1971 |
| [73] | Assignee | Federal Pacific Electric Company<br>Newark, N.J. |

[54] THERMOSTAT
6 Claims, 5 Drawing Figs.

[52] U.S. Cl. .................................................. 337/100,
337/107, 337/347, 337/377
[51] Int. Cl. ........................................... H01h 37/04,
H01h 37/14, H01h 37/52
[50] Field of Search .......................................... 337/89, 92,
99, 100, 102, 105, 107, 347, 354, 377, 378

[56] References Cited
UNITED STATES PATENTS
| 3,360,197 | 12/1967 | Stringham | 337/100(X) |
|---|---|---|---|
| 3,277,260 | 10/1966 | Anderson | 337/100(X) |
| 3,239,633 | 3/1966 | Bletz | 337/347 |
| 3,205,327 | 9/1965 | Moorhead et al. | 337/102(X) |

FOREIGN PATENTS
| 1,077,283 | 7/1967 | Great Britain | 337/107 |

*Primary Examiner*—Bernard A. Gilheany
*Assistant Examiner*—Dewitt M. Morgan
*Attorneys*—Paul S. Martin and Richard M. Rabkin ABSTRACT: A thermostat is provided with a heating element adhered over an area of the room temperature sensing bimetal, and the bimetal is arranged to operate a snap switch that controls the current supply to an electric heater for the room in which the thermostat monitors the ambient temperature. The adhered heating element operates not merely as a conventional anticipator but develops shorter on-and-off cycle times of current supply to the room electric heater, reducing temperature swings and reducing droop.

Patented June 28, 1971
3,588,774
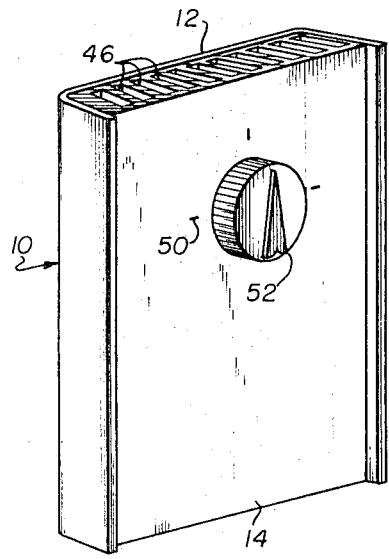
FIG.1
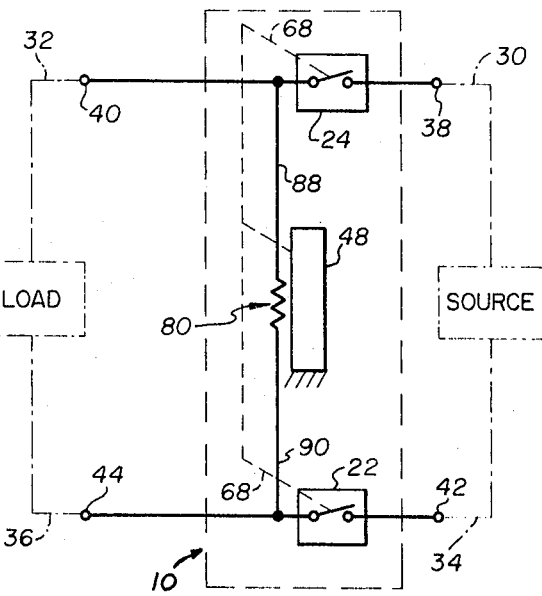
FIG.2
FIG.3
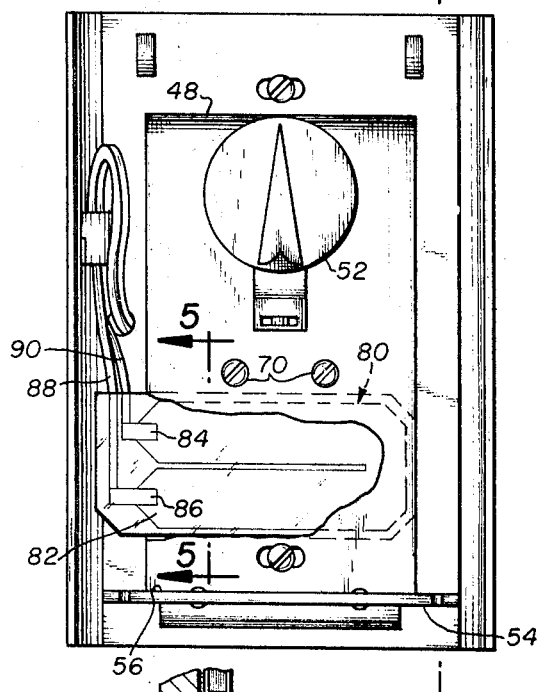
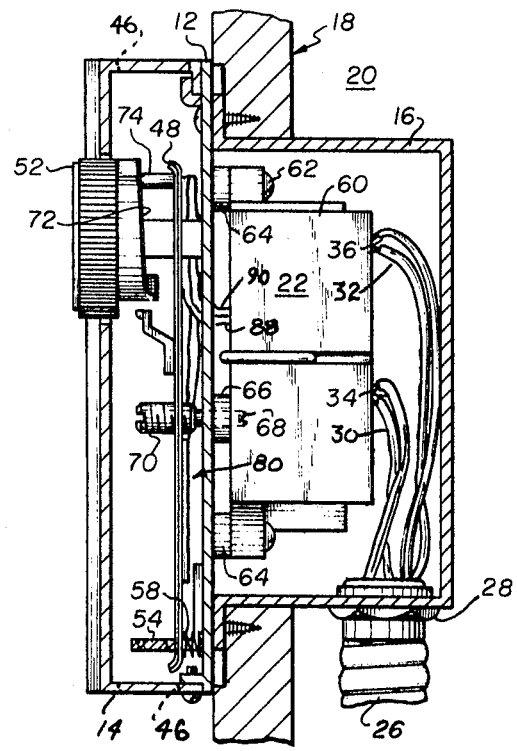
FIG.4
FIG.5
INVENTOR.
FRANK CAVENEY
BY Richard M. Rabkin
ATTORNEY

THERMOSTAT

This invention relates to thermostats and more particularly to improvements in line voltage thermostats. The utilization of electricity as a heating source has increased on an annual basis. To a considerable extent this increase is due in part to the provision of convenient room-by-room temperature control. Baseboard heaters employing electric resistance heating elements energized at powerline voltages are most suitable for this type of controlled operation. Installation economics dictate that, where possible, the thermostat should directly control the operation of the heating element. That is, if the heating element is to be energized at a powerline voltage of 240 volts, then a thermostat incorporating a switch capable of operating at 240 volts should be used. The matching of the voltage rating of heater and thermostat provides a lower cost installation by obviating the need for a low voltage transformer, low voltage control wiring and a relay operated by the thermostat for controlling the line voltage heater. Obviously, a line voltage thermostat carries the full load current of the heater which current is directly dependent upon the line voltage and the wattage of the heaters connected thereto.

The switches employed in line voltage thermostats are, of necessity, relatively sensitive low operating force snap switches since they are directly operated by the deflection of the bimetal in response to changing ambient temperatures and the amount of force generated by the bimetal is limited. Line voltage thermostats are normally mounted on a junction box which is built in to the wall of the room to be heated. Within the junction box the connections between the powerline, the thermostat and the heater are made. The switches and their contacts herein contemplated are rated at 22 amps in order to provide a thermostat usable with connected loads of up to at least 5000 watts. The switch rating is obtained with an allowable temperature rise of the switch housing of 50° C. above ambient according to the provisions of the Underwriters' Laboratories. When such switches are used in thermostats to switch high load currents the close association of the ambient temperature responsive bimetal and the switch has produced false operation of the bimetal due to the localized heat source.

The heat due to the current carried by the switch became a particularly acute problem where the requirement for room or area heating continued over a long period of time. The longer the heater required energization and therefore the longer the thermostat carried current, the higher the temperature of the switch became. Since the snap switch is mounted at the rear of the thermostat base for electrical safety reasons and projects into the junction box, heat generated in the switch is trapped in a space from which there is little heat loss. The mass of the switch was gradually heated to such a temperature that it caused the bimetal to turn off the snap switches as though the controlled room was considerably warmer than it actually was. Therefore the room temperature became progressively lower when more heat in the room was actually needed. This "-drooping" response characteristic has created problems in electrical heating. It is an object of this invention to provide a line voltage thermostat in which the deleterious effects of localized heating due to the high currents handled by the thermostat switch are minimized.

It is yet another object of this invention to provide a thermostat having improved temperature response characteristics.

Many expedients have been tried to overcome problems of "overshoot" and "undershoot" of thermostats. For the most part such expedients have been unsuccessful. A further object of this invention resides in the provision of a thermostat having improved "overshoot" and "undershoot" characteristics. Still another object of this invention is the provision of a thermostat having an average cycling rate between 5 and 10 cycles per hour which cycling rate is substantially independent of ambient temperature.

Line voltage thermostats are generally applied indiscriminately by the installing electrician for the control of a wide range of loads. The same thermostat type may, within the same home or other establishment, control electric heat loads varying from a nominal 250 watts up to the maximum rating of approximately 5,000 watts. Any load rating within this range is possible and therefore it is an object of this invention to provide a thermostat operable over a wide range of controlled loads with minimized effect of localized heating of the thermostat switch and with minimized overshoot and undershoot.

Briefly, the preferred embodiment of the invention includes a thermostat including base on which is mounted a temperature responsive bimetal and a snap switch mounted on the base in heat transfer relation to the bimetal. The snap switch is adapted to directly control the operation of a high current load device such as a baseboard heater. The switch is heated by the load device current when the current flows through the switch which heating causes a change in the ambient temperature of the bimetal. The bimetal is mounted, at one end, on the base and means are provided which mechanically link the switch and the bimetal whereby the switch is actuated as the bimetal is exposed to a change in ambient temperature. A cycling heater is secured to one face of the bimetal in intimate heat transfer relationship thereto. The cycling heater is connected in parallel with the load device so as to be energized concurrently. The cycling heater causes the bimetal to deflect at a controlled number of cycles per hour substantially independently of the ambient temperature so that the heating of the switch by the load current is reduced by averaging thereby reducing the effect of the localized switch heating on the bimetal.

The above and other objects and advantages of the invention and its various aspects are achieved by the illustrative embodiment described in detail below and shown in the accompanying drawings.

In the drawings:

FIG. 1 is a perspective of a thermostatic control means constituting an illustrative embodiment of the invention;

FIG. 2 is a schematic of a presently preferred embodiment of the novel temperature control system;

FIG. 3 is a plan view of the thermostat of FIG. 1 with the casing cover removed;

FIG. 4 is a side view, in partial section and with some parts omitted, of a thermostat of FIG. 3 as viewed along the line 4-4 thereof; and FIG. 5 is a fragmentary side view, in partial section of a portion of the thermostat of FIG. 3 on a greatly enlarged scale, as viewed along the line 5-5 thereof.

The embodiment of the invention in FIG. 1 includes a thermostatic control means 10 having a casing which includes a wall mounting plate or base 12 and a front cover 14. Base 12 is secured to a junction box or a gem box 16 which is built in to the room wall 18 as shown in FIG. 4. It will be understood by those skilled in the art that the room wall 18 includes a dead air space 20 between the wall portion 18, shown in the drawings, and an opposite wall surface, not shown. In the widely employed "dry wall" or gypsum board type of construction a wooden frame is erected and then opposed sheets of wall surfacing material are applied thereto. The deal air apace 20 is formed by the wooden wall studs, not shown, the wall portion 18 and the opposed wall portion, not shown.

The illustrative embodiment of the invention is a two-pole thermostat that has two side-by-side snap switches 22, 24 that are connected between the energizing source and the heating load. A pair of power cables 26 (one shown) containing conductors 30, 32, 34, 36 are threaded through the space 20 and are secured to the junction box 16 by connectors 28. The power conductors 30—36 are connected to thermostat terminals 38, 40, 42, 44, respectively.

The thermostat cover 14 has a plurality of openings 46 formed in its opposed end walls to permit flow of room air into and through the casing wherein the thermally responsive bimetal 48 is mounted. The cover bears temperature indicia 50 for cooperation with the indicator of the external control knob 52. Knob 52 is connected to the bimetal for adjusting the temperature response setting of the thermostat 10.

Bimetal 48 is mounted at one end to base 12 by appropriate mounting means. The mounting means includes an apertured bar 54 secured to the base 12. Bar 54 straddles a necked-down portion of the bimetal that provides a pair of shoulders 56 which serve as pivots of the bimetal with respect to the bar 54. The bimetal is maintained in contact with the bar by a pair of springs 58 that react between the base 12 and the bimetal 48.

The snap switches 22 and 24 are contained within an electrically insulating plastic housing 60. Housing 60 is secured by screws 62 to the face of the base 12 opposite bimetal 48 and extends within the interior of the junction box 16. The switches are spaced from the base 12 by bosses 64 at the ends of the housing 60. A central boss 66 has an interior passageway for the switch operating plungers or pins 68 for each of the switches. The switch operating pins 68 are operable by calibrating screws 70 threadedly engaged in and carried by the bimetal 48. Once the thermostat is calibrated at the factory the screws 70 are locked in position by the application of an appropriate cement.

The position of the calibrating screws 70 and the operating pins 68 with respect to the operating or snap point of the switches 22, 24 is adjusted by knob 52 which has a cam surface 72 in engagement with a pin 74 carried by the bimetal. The pin 74 is maintained in engagement with the cam 72 by the springs (not shown) of the the snap switches 22, 24 that keep the pins 68 against the screws 70. Operation of the switches is produced by the temperature-responsive movement of the center of the bimetal since, for any setting, the bimetal is relatively fixed at both its ends. Adjustment of the knob changes the position of the bimetal 48 with respect to the switches thereby changing the amount of deflection necessary before the switches are operated. In this way the user of the thermostat is able to select the operating temperature of the bimetal and the thermostat.

What has been described heretofore is a well-known form of construction of line voltage thermostats. Such a thermostat has been assumed to have a control differential between its cut on temperature and its cutoff temperature, i.e., the temperatures at which the switches 22, 24 are operated to energize and deenergize the connected heater. This differential is normally measured by noting the change in the knob 52 setting required to obtain operation of the switches 22, 24 at a given room temperature and without an energized heater. Theoretically, when the thermostat cuts on in response to a low temperature outside condition as sensed by a lower room temperature, the heater connected thereto is energized and after a short warmup delay the room temperature starts to rise. The rising room temperature heats the thermostat sensing element, in this case bimetal 48. In order to heat the bimetal to the cutoff point, however, the room temperature must rise above the cutoff point. This causes the room temperature to overshoot the control setting. When the thermostat does cut off, the heater is deenergized but there is some stored heat that continues to flow into the room further increasing the overshoot until some maximum room temperature is reached.

When the cooling effect of the room heat loss overcomes the effect of the heater input, the room temperature starts to fall and the bimetal cools off. Again, however, in order to cool the bimetal to the cut on point the room temperature must fall to below the cut on point, causing the room temperature to undershoot the control setting. When the thermostat cuts in, the heater is energized but there is a time delay during which the heater warms up and before it starts delivering heat to the room. During this time the room temperature falls further increasing the undershoot to some minimum temperature before the room temperature rise starts again. Thus, the room temperature swings to a differential which is greater than the control differential of the thermostat by the amount of the overshoot plus the undershoot.

When the outside temperature drops further the room heat loss increases and the "on" time of the heater is increased to overcome this added heat loss thus giving a higher percentage of on time for the device. When the outside temperature rises the opposite effect occurs and the lower percent of on time is required to make up for the diminished heat loss in the room.

This is a simplified explanation of the thermostat operation and it generally believed that the thermostat generally, however erroneously, will hold the room temperature at approximately the level set by knob 52 regardless of the heat loss, within the capacity of the heater. However, tests have proven that certain other factors must be taken into consideration to determine and explain the actual thermostat performance. As explained above, the thermostat is assumed to have a control differential between a cut on and a cutoff temperature. This is generally determined by manipulation of the control knob 52 with no load connected to the thermostat. Such a differential may be described as being a no load differential at a given knob setting. It must be recognized, however, that when the thermostat is connected to a sizable load and the thermostat cuts on, the room heater is energized by the current flowing through the snap switches 22 and 24 of the thermostat. Immediately the temperature of the thermostat switches 22, 24 themselves and the housing 60 starts to rise due to the $I^2R$ losses in their contact and conductors. This internal heat raises the temperature of parts of the thermostat several degrees above the cutoff temperature. It is primarily this heat that causes the thermostat to cut off as the heat inside the thermostat is conducted by the base 12 and the air in the casing and acts on the sensing element. When the thermostat cuts off the temperature of the switches 22, 24 begins to drop as the heat built up within the thermostat is dissipated to the surrounding air, wall surfaces and along the connecting wires, etc. If the surrounding materials are below the cut-in temperature of the thermostat, the thermostat will cut in again after a time interval which is dependent on the amount of internal and the rate of heat loss. At cut on the internal heating up again and the cycle is repeated. In this way the thermostat will cycle itself on a timing cycle which is a function of the amount of internal heating, its thermal mass and the transfer rate to the surround which includes all elements that absorb heat from the thermostat. Under equilibrium cycling condition these factors can achieve a dynamic balance in which the heat gains of the thermostat equal heat losses and it operates like a thermal timer without particular regard to the actual room conditions.

The effect of room temperature on this cycling operation is to gradually modulate the cycle rate whenever the dynamic balance is upset. A change in the outside temperature upsets the dynamic balance due to the increased heat loss from the space monitored which reduces the room temperature. This is sensed as a lower temperature at the thermostat that increases the dynamic heat loss of the thermostat to the surround and requires that either more heat be generated internally or the room temperature rises before the thermostat cuts off. The heater output being a fixed quantity it has an almost negligible effect at this time. The requirement of more heat input to the room results in a longer period of energization or on-time and therefore a higher switch temperature and more stored heat. This stored heat keeps the temperature of the switch elevated and, until its effect on the bimetal is dissipated by the room air cooling the bimetal or by the surround cooling the bimetal the heater connected to the thermostat remains deenergized. This longer period of deenergization due to the increased switch temperature caused by the longer energization period results in a most unfortunate situation, i.e., that during those times that continuous heating is required the thermostat is shut off for a greater time due to its internal heating. As can be readily understood, this is a most unfortunate situation since the heat input into the room is actually decreased during the colder operating times resulting in considerable user dissatisfaction.

In order to minimize the heat buildup in the switches 22, 24 during long periods of heater operation, means are provided for enforcing an increased cycling rate on the thermostat and, equally advantageously, providing for the minimization of overshoot and undershoot.

Referring to the drawings the cycling means includes a heater element 80 adhered to one surface of the bimetal 48 in intimate heat transfer relationship therewith. Heater 80 is composed of a relatively flat resistive element 82 which has a pair of end terminals 84, 86 to which are connected lead wires 88 and 90. Lead wires 88 and 90 pass through an aperture in base 12 and are connected to the load side of the snap switches 22, 24 respectively so that the heater 80 is energized concurrently with the load. The resistive element 82 is enclosed in a heat transmitting electrically insulating jacket 92. Jacket 92 is secured to the bimetal by an adhesive layer 94.

Concurrent energization of the heater 80 and the load superimposes an artificial cycling rate on that otherwise established by the internal heating of the thermostat. An artificial cycling rate of between 6 and 12 cycles an hour has been found to be particularly effective. It is believed that this range of cycling rate serves to limit the temperature and the amount of heat built up in the mass of the snap switches and other components of the thermostat which reduces, substantially, the effect of this heat on the bimetal response characteristic without adversely effecting the performance of the "load" heater or the room temperature. By "averaging" the amount of heat generated in the switches by the load current the operation of the thermostat during periods of high heating demand is improved in that the effect of the room temperature is less obscured by the internal heating of the thermostat than in the prior construction described above. Additionally, the enforced cycling rate produces a reduction in the amount of overshoot and undershoot.

In the preferred embodiment of the invention the heater 80 has a very low mass and is spread over a large area of the bimetal. Thus little heat is stored in the heater or the associated area of the bimetal. It has been found to be advantageous to locate the heater on the interior face of the bimetal so that the heater is protected from damage during installation and is still exposed to the air currents flowing through the vents 46 in the cover 14. In this construction the heater reaches its operating temperature rapidly and then cools rapidly due to its small mass. A desirable cycling rate of 6—12 cycles per hour has been obtained with a heater having a one-quarter watt rating (200,000 ohms at 208 volts or 320,000 ohms at 240 volts). The heater element 82 is a dispersion of conductive particles in an insulating base so as to provide a relatively flat low thermal mass heater. The low profile of the heater minimizes obstruction of air flow between the bimetal and the base contributing in part to the thermal isolation of the bimetal from the base. The jacket 92 is advantageously fabricated from Kapton, an electrically insulating plastic which can be heat sealed for total encapsulation of the heater element. The jacket 92 closely fits the heater and, associated lead wires 88 and 90.

While only one embodiment of the invention has been shown and described in detail, it will be obvious to those skilled in the art that various changes and modifications may be made therein without departing from the spirit and scope of the invention.

I claim:

1. A thermostat for room-temperature control, including a base having a front face disposed vertically when installed normally, a snap switch carried by said base and proportioned to carry and interrupt the operating current of electrically powered room-temperature modifying apparatus, a generally planar bimetal disposed generally parallel to said front face of said base for sensing the ambient room temperature, said bimetal being proportioned to operate said snap switch, mechanical coupling means between said bimetal and said switch for effecting operation of the switch is response to temperature changes sensed by the bimetal, and an electrically insulated cycling heater of relatively low thermal mass secured to and carried by said bimetal in intimate heat transfer relationship thereto, said cycling heater being electrically connected to said switch for energization and deenergization concurrently with the supply and interruption of current to the room-temperature modifying apparatus.

2. A thermostat in accordance with claim 1 wherein said bimetal is subject to heat transfer from said switch, said cycling heater being proportioned to induce relatively short on-and-off cycles of switch operation, the temperature rise of the switch resulting from flow of load current therethrough being reduced by averaging as a result of said relatively short cycles.

3. A thermostat in accordance with claim 1 wherein said cycling heater is of planar form and is adhered to one face of the bimetal so as to form a low profile and to have a minimal effect on air flowing vertically along said heater and said bimetal.

4. A thermostat according to claim 1 further including a cover overlying said base and provided with air passages therethrough, said cycling heater being secured to said bimetal on the face thereof nearest said base, said cycling heater having a low profile whereby said heater has minimal interference with air flow through the space between said bimetal and said base.

5. A thermostat according to claim 4 wherein said switch is mounted on said base on the opposite side of said base from said bimetal and said heater is connected to said switch by means passing through said base.

6. A thermostat according to claim 1 wherein said cycling heater output provides a cycling rate of 6 to 12 cycles per hour.